(12) United States Patent
Li

(10) Patent No.: US 11,683,222 B2
(45) Date of Patent: Jun. 20, 2023

(54) VIRTUAL NETWORK FUNCTION VNF DEPLOYMENT METHOD AND APPARATUS

(71) Applicant: Huawei Technologies Co., Ltd., Shenzhen (CN)

(72) Inventor: Shitao Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/548,839

(22) Filed: Dec. 13, 2021

(65) Prior Publication Data

US 2022/0103423 A1 Mar. 31, 2022

Related U.S. Application Data

(63) Continuation of application No. PCT/CN2020/095804, filed on Jun. 12, 2020.

(30) Foreign Application Priority Data

Jun. 14, 2019 (CN) .......................... 201910517265.1

(51) Int. Cl.
*H04L 41/0806* (2022.01)
*H04L 41/0893* (2022.01)
(Continued)

(52) U.S. Cl.
CPC ...... *H04L 41/0806* (2013.01); *G06F 9/45558* (2013.01); *H04L 41/0893* (2013.01);
(Continued)

(58) Field of Classification Search
CPC ............ H04L 41/0806; H04L 41/0893; H04L 41/5054; H04L 41/0895; H04L 41/40; G06F 9/45558; G06F 2009/45595

See application file for complete search history.

(56) References Cited

U.S. PATENT DOCUMENTS 9,806,975 B2 10/2017 Xiang
10,469,317 B1 * 11/2019 Jiang ..................... H04L 41/082
(Continued)

FOREIGN PATENT DOCUMENTS

CN 105790976 A 7/2016
CN 106161076 A 11/2016
(Continued)

OTHER PUBLICATIONS

"Network Functions Virtualisation (NFV); Management and Orchestration; VNF Descriptor and Packaging Specification", ETSI GS NFV-IFA 011; https://www.etsi.org/deliver/etsi_gs/NFV-IFA/001_099/011/03.01,01_60/gs_nfv-ifa011v030101p.pdf, V3.1.1, 63 pages (Year: 2018).*
(Continued)

*Primary Examiner* — William G Trost, IV
*Assistant Examiner* — Adam A Cooney
(74) *Attorney, Agent, or Firm* — Slater Matsil, LLP

(57) ABSTRACT

A virtual network function (VNF) deployment method and apparatus, the method including separately setting indication information of a common parameter and dedicated parameter in a virtual network function descriptor (VNFD), to indicate a source of a value of the common parameter and a source of a value of the dedicated parameter, where the common parameter and the dedicated parameter are included in input parameters. When assigning values to the common parameter and the dedicated parameter, a virtualization service provider obtains the value of the common parameter based on the indication information of the common parameter, and obtains the value of the dedicated parameter based on the indication information of the dedicated parameter.

20 Claims, 4 Drawing Sheets

(51) Int. Cl.
  *H04L 41/5041* (2022.01)
  *H04L 41/5054* (2022.01)
  *G06F 9/455* (2018.01)

(52) U.S. Cl.
  CPC ...... *H04L 41/5048* (2013.01); *H04L 41/5054* (2013.01); *G06F 2009/45595* (2013.01)

(56) References Cited

U.S. PATENT DOCUMENTS

| | | | |
|---|---|---|---|
| 10,587,462 B2 * | 3/2020 | Zhao | ............... G06F 8/61 |
| 10,700,928 B2 | 6/2020 | Li | |
| 2016/0269925 A1 | 9/2016 | Chou et al. | |
| 2016/0328259 A1 * | 11/2016 | Xia | ............... H04L 41/28 |
| 2017/0006083 A1 | 1/2017 | McDonnell | |
| 2017/0346831 A1 * | 11/2017 | Liu | ............... G06F 9/45558 |
| 2018/0063184 A1 * | 3/2018 | Feng | ............... H04L 63/1433 |
| 2018/0309646 A1 * | 10/2018 | Mustafiz | ............... H04L 67/51 |
| 2018/0367418 A1 * | 12/2018 | Dravid | ............... H04L 41/0806 |
| 2019/0173802 A1 | 6/2019 | Xia et al. | |

FOREIGN PATENT DOCUMENTS

| | | |
|---|---|---|
| CN | 106161603 A | 11/2016 |
| CN | 106464535 A | 2/2017 |
| CN | 107357836 A | 11/2017 |
| CN | 107623578 A | 1/2018 |
| CN | 107689882 A | 2/2018 |
| CN | 108234158 A | 6/2018 |
| CN | 108400998 A | 8/2018 |
| CN | 108462592 A | 8/2018 |
| CN | 109391483 A | 2/2019 |
| CN | 109522090 A | 3/2019 |
| CN | 109600246 A | 4/2019 |
| EP | 3267654 A1 | 1/2018 |
| WO | 2016197643 A1 | 12/2016 |

OTHER PUBLICATIONS

"3rd Generation Partnership Project; Technical Specification Group Services and System Aspects; Telecommunication management; Life Cycle Management (LCM) for mobile networks that include virtualized network functions; Requirements (Release 14)," 3GPP TS 28.525 V1.2.0, Jan. 2017, 47 pages.

"Network Functions Virtualization (NFV); Management and Orchestration;VNF Packaging Specification," GS NFV IFA 011 V0.5.0, XP14270180A, Mar. 2016, 56 pages.

"IFA007ed241 Align the usage of modifying VNF configuration parameters," NFVIFA(17)0001129, XP14304641A, Huawei Tech. (UK) Co., Ltd, , Dec. 1, 2017, 5 pages.

"IFA007ed311 Metadata Extension ConfigurableProps clarification for VnfInfo," NFVIFA(18)000859, XP14323589A, Nokia Germany, Nov. 5, 2018, 4 pages.

"IFA007ed321 Declaration of Metadata and Extensions," Nokia Germany, NFVIFA(18)0001068r1, XP14333408A, Nov. 30, 2018, 4 pages.

* cited by examiner

VIRTUAL NETWORK FUNCTION VNF DEPLOYMENT METHOD AND APPARATUS

CROSS-REFERENCE TO RELATED APPLICATIONS

This application is a continuation of International Application No. PCT/CN2020/095804, filed on Jun. 12, 2020. The International Application claims priority to Chinese Application No. 201910517265.1, filed on Jun. 14, 2019. The afore-mentioned patent applications are hereby incorporated by reference in their entirety.

TECHNICAL FIELD

This application relates to the field of network function virtualization, and in particular, to a virtual network function (VNF) deployment method and an apparatus.

BACKGROUND

In a network function virtualization (NFV) technology, a virtualization technology is used to virtualize a function of a dedicated device in a conventional network into an independent application, and flexibly deploy the application on a unified infrastructure platform constructed based on other standard devices such as computing hardware, storage hardware, and network hardware. In an NFV system, a party that initiates a virtual network function (VNF) instantiation request may be referred to as a virtualization service requestor. A party that receives the VNF instantiation request and deploys a VNF based on the VNF instantiation request may be referred to as a virtualization service provider. After receiving the VNF instantiation request, the virtualization service provider further needs to obtain a VNF descriptor (VNFD). The VNFD includes input parameters ("inputs") required for deploying the VNF, and the VNF instantiation request includes values of the input parameters. After assigning values to the input parameters, the virtualization service provider deploys the VNF based on an updated VNFD.

Because requirements of VNFs are different, input parameters included in VNFDs corresponding to different VNFs are also different. To facilitate adaptation of all input parameters of different VNFs into the VNF instantiation request, a European Telecommunications Standards Institute (europe telecommunications standards institute, ETSI) NFV standard specifies that all service-related dedicated parameters in the input parameters are defined as a modifiable attributes parameter ("modifiable_attributes"), and the virtualization service provider is notified of a value of the modifiable attributes parameter by using a Modify VNF Information operation ("ModifyVnfInfo"). In this case, the VNF instantiation request includes the value of the modifiable attributes parameter and a value of a common parameter related to all VNFs. Although the virtualization service provider may learn of the value of the modifiable attributes parameter by using the Modify VNF Information operation, a conventional technology does not include a solution for assigning a value to a modifiable attributes parameter in the VNFD by using the value of the modifiable attributes parameter included in the Modify VNF Information operation. Therefore, the virtualization service provider can assign a value to only a common parameter in the VNFD by using the value of the common parameter included in the VNF instantiation request, but cannot assign a value to the modifiable attributes parameter in the VNFD. As a result, VNF deployment fails.

SUMMARY

This application provides a virtual network function (VNF) deployment method and an apparatus, to resolve a problem of how to assign a value to a modifiable attributes parameter in a VNFD.

To achieve the foregoing objective, the following technical solutions are used in this application.

According to a first aspect, this application provides a VNF deployment method. The method may be applied to an application deployment server, or the method may be applied to a communication apparatus that can support the application deployment server in implementing the method. For example, the communication apparatus includes a chip system. In some embodiments, the application deployment server may be a VNF manager (VNF manager, VNFM). The method includes after a Modify VNF Information operation is received, obtaining a VNFD of a first VNF, and assigning N dedicated parameters and a value of each dedicated parameter to a modifiable attributes parameter in the VNFD based on a second assignment indication, to obtain a first updated VNFD, where the Modify VNF Information operation includes the modifiable attributes parameter, the modifiable attributes parameter includes the N dedicated parameters and the value of each dedicated parameter, the N dedicated parameters and the value of each dedicated parameter are parameters required for instantiating the first VNF, N is an integer, and N≥1, where the VNFD of the first VNF includes M common parameters, the modifiable attributes parameter, M first assignment indications, and one second assignment indication, one of the first assignment indications is used to indicate to obtain a value of one common parameter from a virtualization service requestor, the second assignment indication is used to indicate to obtain a value of the modifiable attributes parameter from a virtualization service provider, M is an integer, and N≥1, and after a VNF instantiation request is received, assigning the values of the M common parameters to corresponding common parameters in the first updated VNFD based on the first assignment indications, to obtain a second updated VNFD, and deploying the first VNF based on the second updated VNFD. The VNF instantiation request includes the M common parameters and the value of each common parameter, and the M common parameters and the value of each common parameter are parameters required for instantiating the first VNF.

According to a second aspect, this application provides a VNF deployment method. The method may be applied to an application deployment server, or the method may be applied to a communication apparatus that can support the application deployment server in implementing the method. For example, the communication apparatus includes a chip system. In some embodiments, the application deployment server may be a VNFM. The method includes after a Modify VNF Information operation and a VNF instantiation request are received, obtaining a VNFD of a first VNF, assigning values of M common parameters to corresponding common parameters in the VNFD based on first assignment indications, assigning N dedicated parameters and a value of each dedicated parameter to a modifiable attributes parameter in the VNFD based on a second assignment indication, to obtain a first updated VNFD, and deploying the first VNF based on the first updated VNFD. The Modify VNF Information operation includes the modifiable attributes parameter, the modifiable attributes parameter includes the N dedicated parameters and the value of each dedicated parameter, the N dedicated parameters and the value of each dedicated parameter are parameters required for instantiating the first VNF, N is an integer, and N≥1. The VNF instantiation request includes the M common parameters and the value of each common parameter, the M common parameters and the value of each common parameter are parameters required for instantiating the first VNF, M is an integer, and M≥1. The VNFD of the first VNF includes the M common parameters, the modifiable attributes parameter, M first assignment indications, and one second assignment indication, one of the first assignment indications is used to indicate to obtain a value of one common parameter from a virtualization service requestor, and the second assignment indication is used to indicate to obtain a value of the modifiable attributes parameter from a virtualization service provider.

According to the VNF deployment method provided in this application, in the VNFD, indication information is separately set for a common parameter and a dedicated parameter, to indicate a source of a value of the common parameter and a source of a value of the dedicated parameter, where the common parameter and the dedicated parameter are included in input parameters. When the application deployment server assigns values to the common parameter and the dedicated parameter, the application deployment server is enabled to assign the value to the common parameter in the VNFD based on the first assignment indication, and assign the value to the modifiable attributes parameter in the VNFD based on the second assignment indication, so that all input parameters in the VNFD are assigned with values, and the VNF is successfully deployed.

In a possible implementation, the virtualization service requestor is an NFV orchestrator (NFVO) or an operation-support system/business support system (OSS/BSS). The virtualization service requestor may be user equipment. The virtualization service provider is the VNFM. The virtualization service provider may be the application deployment server.

In another possible implementation, before the Modify VNF Information operation is received, the method further includes after a Create VNF Identifier operation sent by the NFVO is received, creating an instance identifier of the first VNF, establishing a correspondence between the instance identifier of the first VNF and an identifier of the VNFD of the first VNF, and sending the instance identifier of the first VNF to the NFVO. The Create VNF Identifier operation includes the identifier of the VNFD of the first VNF.

In another possible implementation, the obtaining a VNFD of a first VNF includes sending a VNFD obtaining request to the NFVO, where the VNFD obtaining request includes the identifier of the VNFD of the first VNF, and receiving a VNFD response sent by the NFVO, where the VNFD response includes the VNFD of the first VNF.

In another possible implementation, the Modify VNF Information operation further includes the instance identifier of the first VNF, and the VNF instantiation request further includes the instance identifier of the first VNF, and before the values are assigned to the N common parameters and the modifiable attributes parameter in the VNFD, the method further includes determining the identifier of the VNFD of the first VNF associated with the instance identifier of the first VNF, and determining the VNFD of the first VNF based on the identifier of the VNFD of the first VNF.

In another possible implementation, after the instance identifier of the first VNF is created, the method further includes creating VNF information storage space, where the VNF information storage space is used to store the N dedicated parameters and the value of each dedicated parameter. Therefore, the application deployment server can obtain the value of the modifiable attributes parameter from the VNF information storage space, and assign the value to the modifiable attributes parameter in the VNFD, to assign values to all input parameters in the VNFD, and successfully deploy the VNF.

According to a third aspect, this application provides a VNF deployment method. The method may be applied to user equipment, or the method may be applied to a communication apparatus that can support the user equipment in implementing the method. For example, the communication apparatus includes a chip system. In some embodiments, the user equipment may be an NFVO. The method includes sending a Modify VNF Information operation, where the Modify VNF Information operation includes a modifiable attributes parameter, the modifiable attributes parameter includes N dedicated parameters and a value of each dedicated parameter, the N dedicated parameters and the value of each dedicated parameter are parameters required for instantiating a first VNF, N is an integer, and N≥1, sending a VNFD of the first VNF, where the VNFD of the first VNF includes M common parameters, the modifiable attributes parameter, M first assignment indications, and one second assignment indication, one of the first assignment indications is used to indicate to obtain a value of one common parameter from a virtualization service requestor, and the second assignment indication is used to indicate to obtain a value of the modifiable attributes parameter from a virtualization service provider, and sending a VNF instantiation request, where the VNF instantiation request includes the M common parameters and the value of each common parameter, the M common parameters and the value of each common parameter are parameters required for instantiating the first VNF, M is an integer, and M≥1.

According to a fourth aspect, this application provides a VNF deployment method. The method may be applied to user equipment, or the method may be applied to a communication apparatus that can support the user equipment in implementing the method. For example, the communication apparatus includes a chip system. In some embodiments, the user equipment may be an NFVO. The method includes sending a Modify VNF Information operation, where the Modify VNF Information operation includes a modifiable attributes parameter, the modifiable attributes parameter includes N dedicated parameters and a value of each dedicated parameter, the N dedicated parameters and the value of each dedicated parameter are parameters required for instantiating a first VNF, N is an integer, and N≥1, sending a VNF instantiation request, where the VNF instantiation request includes M common parameters and a value of each common parameter, the M common parameters and the value of each common parameter are parameters required for instantiating the first VNF, M is an integer, and M≥1, sending a VNFD of the first VNF, where the VNFD of the first VNF includes the M common parameters, the modifiable attributes parameter, M first assignment indications, and one second assignment indication, one of the first assignment indications is used to indicate to obtain a value of one common parameter from a virtualization service requestor, and the second assignment indication is used to indicate to obtain a value of the modifiable attributes parameter from a virtualization service provider.

According to the VNF deployment method provided in this application, in the VNFD, indication information is separately set for a common parameter and a dedicated parameter, to indicate a source of a value of the common parameter and a source of a value of the dedicated parameter, where the common parameter and the dedicated parameter are included in input parameters. When an application deployment server assigns values to the common parameter and the dedicated parameter, the application deployment server is enabled to assign the value to the common parameter in the VNFD based on the first assignment indication, and assign the value to the modifiable attributes parameter in the VNFD based on the second assignment indication, so that all input parameters in the VNFD are assigned with values, and the VNF is successfully deployed.

In a possible implementation, the virtualization service requestor is the NFVO or an OSS/a BSS. The virtualization service requestor may be the user equipment. The virtualization service provider is a VNFM. The virtualization service provider may be the application deployment server.

In another possible implementation, when one of the first assignment indications is used to indicate to obtain a value of one common parameter from the NFVO, before the NFVO sends the VNF instantiation request, the method further includes setting, by the NFVO, the value of the common parameter.

In another possible implementation, before the Modify VNF Information operation is sent, the method further includes sending a Create VNF Identifier operation, receiving an instance identifier of the first VNF, and storing the instance identifier of the first VNF. The Create VNF Identifier operation includes an identifier of the VNFD of the first VNF.

In another possible implementation, before the VNFD of the first VNF is sent, the method includes after a VNFD obtaining request that includes the identifier of the VNFD of the first VNF is received, obtaining the VNFD of the first VNF based on the identifier of the VNFD of the first VNF, and sending a VNFD response, where the VNFD response includes the VNFD of the first VNF.

According to a fifth aspect, this application further provides a communication apparatus, configured to implement the method described in the first aspect or the second aspect. The communication apparatus is an application deployment server or a communication apparatus that supports the application deployment server in implementing the method described in the first aspect or the second aspect. For example, the communication apparatus includes a chip system. For example, the communication apparatus includes a receiving unit and a processing unit. The receiving unit is configured to receive a Modify VNF Information operation, where the Modify VNF Information operation includes a modifiable attributes parameter, the modifiable attributes parameter includes N dedicated parameters and a value of each dedicated parameter, the N dedicated parameters and a value of each dedicated parameter are parameters required for instantiating a first VNF, N is an integer, and N≥1. The receiving unit is further configured to obtain a virtual network function descriptor VNFD of the first VNF, where the VNFD of the first VNF includes M common parameters, the modifiable attributes parameter, M first assignment indications, and one second assignment indication, one of the first assignment indications is used to indicate to obtain a value of one common parameter from a virtualization service requestor, a second assignment indication is used to indicate to obtain a value of the modifiable attributes parameter from a virtualization service provider, M is an integer, and M≥1. The processing unit is configured to assign the N dedicated parameters and the value of each dedicated parameter to the modifiable attributes parameter in the VNFD based on the second assignment indication, to obtain a first updated VNFD. The receiving unit is further configured to receive a VNF instantiation request, where the VNF instantiation request includes the M common parameters and the value of each common parameter, and the M common parameters and the value of each common parameter are parameters required for instantiating the first VNF. The processing unit is further configured to assign the values of the M common parameters to corresponding common parameters in the first updated VNFD based on the first assignment indications, to obtain a second updated VNFD. The processing unit is further configured to deploy the first VNF based on the second updated VNFD. Optionally, the processing unit is configured to assign the values of the M common parameters to the corresponding common parameters in the VNFD based on the first assignment indications, and assign the N dedicated parameters and the value of each dedicated parameter to the modifiable attributes parameter in the VNFD based on the second assignment indication, to obtain the first updated VNFD. The processing unit is further configured to deploy the first VNF based on the first updated VNFD.

Optionally, the communication apparatus may further include a sending unit. The sending unit is configured to send an instance identifier of the first VNF to an NFVO. The sending unit is further configured to send a VNFD obtaining request to the NFVO, where the VNFD obtaining request includes an identifier of the VNFD of the first VNF.

According to a sixth aspect, this application further provides a communication apparatus, configured to implement the method described in the third aspect or the fourth aspect. The communication apparatus is user equipment or a communication apparatus that supports the user equipment in implementing the method described in the third aspect or the fourth aspect. For example, the communication apparatus includes a chip system. For example, the communication apparatus includes a sending unit. The sending unit is configured to send a Modify VNF Information operation, where the Modify VNF Information operation includes a modifiable attributes parameter, the modifiable attributes parameter includes N dedicated parameters and a value of each dedicated parameter, the N dedicated parameters and the value of each dedicated parameter are parameters required for instantiating a first VNF, N is an integer, and N≥1. The sending unit is further configured to send a virtual network function descriptor VNFD of the first VNF, where the VNFD of the first VNF includes M common parameters, the modifiable attributes parameter, M first assignment indications, and one second assignment indication, one of the first assignment indications is used to indicate to obtain a value of one common parameter from a virtualization service requestor, and the second assignment indication is used to indicate to obtain a value of the modifiable attributes parameter from a virtualization service provider. The sending unit is further configured to send a VNF instantiation request, where the VNF instantiation request includes the M common parameters and the value of each common parameter, the M common parameters and the value of each common parameter are parameters required for instantiating the first VNF, M is an integer, and M≥1.

Optionally, the communication apparatus may further include a processing unit, configured to set the value of the common parameter.

In the VNFD, the communication apparatus provided in this application, separately sets indication information of a common parameter and dedicated parameter, to indicate a source of a value of the common parameter and a source of a value of the dedicated parameter, where the common parameter and the dedicated parameter are included in input parameters. When assigning values to the common parameter and the dedicated parameter, the communication apparatus is enabled to assign the value to the common parameter in the VNFD based on the first assignment indication, and assign the value to the modifiable attributes parameter in the VNFD based on the second assignment indication, so that all input parameters in the VNFD are assigned with values, and the VNF is successfully deployed.

In a possible implementation, the virtualization service requestor is an NFVO or an OSS/a BSS. The virtualization service requestor may be the user equipment. The virtualization service provider is a VNFM. The virtualization service provider may be an application deployment server.

It should be noted that function modules in the fifth aspect and the sixth aspect may be implemented by using hardware, or may be implemented by using hardware executing corresponding software. The hardware or software includes one or more modules corresponding to the foregoing functions. For example, a transceiver is configured to complete functions of the receiving unit and the sending unit, a processor is configured to complete a function of the processing unit, and a memory is configured to store program instructions used by the processor to perform the methods in this application. The processor, the transceiver, and the memory are connected by using a bus and implement mutual communication. Specifically, refer to functions of behaviors of the application deployment server or the user equipment in the method according to the first aspect to the method according to the fourth aspect.

According to a seventh aspect, this application further provides a communication apparatus, configured to implement the method described in the first aspect or the second aspect. The communication apparatus is an application deployment server or a communication apparatus that supports the application deployment server in implementing the method described in the first aspect or the second aspect. For example, the communication apparatus includes a chip system. For example, the communication apparatus includes a processor, configured to implement functions of the method described in the first aspect or the second aspect. The communication apparatus may further include a memory, configured to store program instructions and data. The memory is coupled to the processor. The processor invokes and executes the program instructions stored in the memory, to implement the function in the method described in the first aspect or the second aspect. The communication apparatus may further include a communication interface, and the communication interface is used by the communication apparatus to communicate with another device. For example, if the communication apparatus is an application deployment server, the another device is user equipment.

In a possible device, the communication interface may be a transceiver. The processor is configured to assign values of M common parameters to corresponding common parameters in a VNFD based on first assignment indications, and assign N dedicated parameters and a value of each dedicated parameter to a modifiable attributes parameter in the VNFD based on a second assignment indication, to obtain a first updated VNFD, and deploy a first VNF based on the first updated VNFD.

According to an eighth aspect, this application further provides a communication apparatus, configured to implement the method described in the third aspect or the fourth aspect. The communication apparatus is user equipment or a communication apparatus that supports the user equipment in implementing the method described in the third aspect or the fourth aspect. For example, the communication apparatus includes a chip system. For example, the communication apparatus includes a processor, configured to implement functions of the method described in the third aspect or the fourth aspect. The communication apparatus may further include a memory, configured to store program instructions and data. The memory is coupled to the processor. The processor invokes and executes the program instructions stored in the memory, to implement the function in the method described in the third aspect or the fourth aspect. The communication apparatus may further include a communication interface, and the communication interface is used by the communication apparatus to communicate with another device. For example, if the communication apparatus is user equipment, the another device is an application deployment server.

In a possible device, the communication interface may be a transceiver. The transceiver is configured to send a Modify VNF Information operation, where the Modify VNF Information operation includes a modifiable attributes parameter, the modifiable attributes parameter includes N dedicated parameters and a value of each dedicated parameter, the N dedicated parameters and the value of each dedicated parameter are parameters required for instantiating a first VNF, N is an integer, and N≥1, send a VNF instantiation request, where the VNF instantiation request includes M common parameters and a value of each common parameter, the M common parameters and the value of each common parameter are parameters required for instantiating the first VNF, M is an integer, and M≥1, send a VNFD of the first VNF, where the VNFD of the first VNF includes the M common parameters, the modifiable attributes parameter, M first assignment indications, and one second assignment indication, one of the first assignment indications is used to indicate to obtain a value of one common parameter from a virtualization service requestor, and the second assignment indication is used to indicate to obtain a value of the modifiable attributes parameter from a virtualization service provider.

According to a ninth aspect, this application further provides a computer-readable storage medium, including computer software instructions. When the computer software instructions are run on a communication apparatus, the communication apparatus is enabled to perform the method according to any one of the first aspect to the fourth aspect.

According to a tenth aspect, this application further provides a computer program product including instructions. When the computer program product runs on a communication apparatus, the communication apparatus is enabled to perform the method according to any one of the first aspect to the fourth aspect.

According to an eleventh aspect, this application provides a chip system. The chip system includes a processor, and may further include a memory, to implement the function of the application deployment server or the user equipment in the foregoing methods. The chip system may include a chip, or may include a chip and another discrete component.

According to a twelfth aspect, this application further provides a communication system. The communication system includes the application deployment server described in the fifth aspect or a communication apparatus that supports the application deployment server in implementing the method described in the first aspect, and the user equipment described in the sixth aspect or a communication apparatus that supports the user equipment in implementing the method described in the third aspect.

Alternatively, the communication system includes the application deployment server described in the fifth aspect or the communication apparatus that supports the application deployment server in implementing the method described in the second aspect, and the user equipment described in the sixth aspect or the communication apparatus that supports the user equipment in implementing the method described in the fourth aspect.

Alternatively, the communication system includes the application deployment server described in the seventh aspect or the communication apparatus that supports the application deployment server in implementing the method described in the first aspect, and the user equipment described in the eighth aspect or the communication apparatus that supports the user equipment in implementing the method described in the third aspect.

Alternatively, the communication system includes the application deployment server described in the seventh aspect or the communication apparatus that supports the application deployment server in implementing the method described in the second aspect, and the user equipment described in the eighth aspect or the communication apparatus that supports the user equipment in implementing the method described in the fourth aspect.

In addition, for technical effects brought by the design manners of any one of the foregoing aspects, refer to technical effects brought by different design manners of the first aspect and the fourth aspect. Details are not described herein again.

In this application, names of the application deployment server, the user equipment, and the communication apparatus constitute no limitation on the devices. During actual implementation, these devices may have other names. Provided that functions of the devices are similar to those of this application, the devices fall within the scope of the claims of this application and equivalent technologies thereof.

DETAILED DESCRIPTION OF ILLUSTRATIVE EMBODIMENTS

In this specification, claims, and accompanying drawings of this application, the terms "first", "second", "third", and the like are intended to distinguish between different objects but do not limit a particular order.

In embodiments of this application, the word "example" or "for example" is used to represent giving an example, an illustration, or a description. Any embodiment or design scheme described as an "example" or "for example" in the embodiments of this application shall not be explained as being more preferred or having more advantages than another embodiment or design scheme. Exactly, use of the term such as "example" or "for example" is intended to present a related concept in a specific manner.

For clear and concise description of the following embodiments, brief descriptions of related technologies are first provided.

A conventional telecommunication system includes various dedicated hardware devices, and different hardware devices are used for different functions. As a network scale grows, the telecommunication system becomes more complex, which brings a plurality of challenges, for example, development and rollout of a new service, operation and maintenance of the system, and resource utilization. To address these challenges and use a virtualization technology and a cloud computing technology in the internet technology (information technology, IT) industry, at the Software Defined Network and OpenFlow World Congress (SDN and OF world congress) on Oct. 22, 2012, 13 major telecom operators around the world jointly released a network function virtualization (NFV) white paper, and announced establishment of an NFV industry specific group (ISG) in the European Telecommunications Standards Institute (ETSI) to formulate a requirement and a technical framework of NFV, and promote NFV development.

In an NFV technology, the virtualization technology is used to perform resource pooling and virtualization on infrastructure hardware devices (such as a computing device, a storage device, and a network device), to provide a virtual resource for an upper-layer application, and decouple software from hardware. When a new service is developed, a hardware device does not need to be deployed independently. Instead, the virtualization technology needs to be used to virtualize the service into an independent application (for example, a VNF). This greatly shortens rollout time of the new service and greatly increases a virtual resource provisioning speed.

In the NFV technology, the cloud computing technology is used to scale an application, and match a virtual resource with service load. This improves utilization efficiency of the virtual resource, and also improves a response speed of an NFV system.

Figure 1:
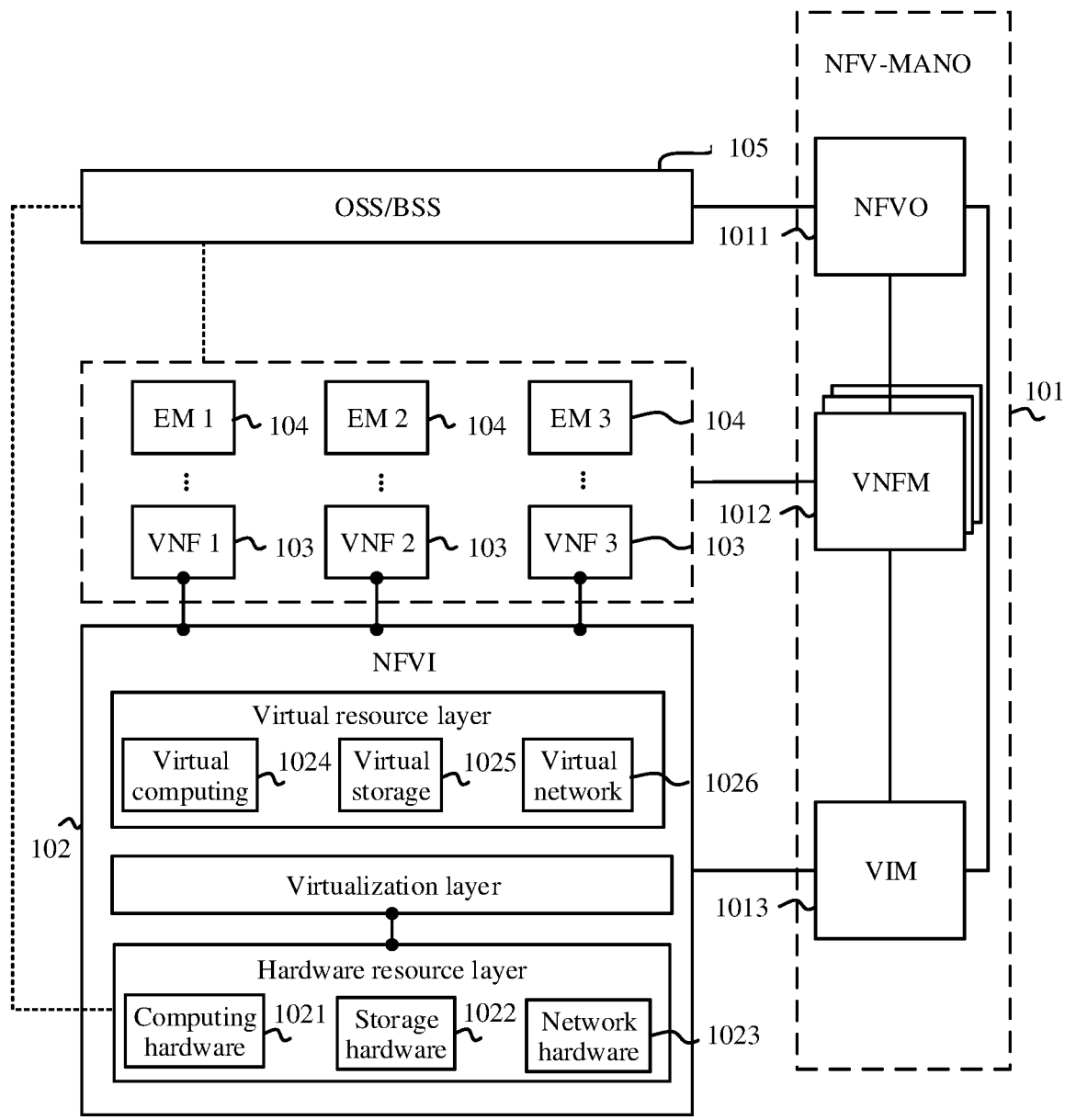
FIG. 1 is an example of an architecture of an NFV system according to an embodiment of this application.

FIG. 1 is an example of an architecture of an NFV system according to an embodiment of this application. The NFV system can be used in various networks, for example, implemented in a data center network, a telecom operator network, or a local area network. The NFV system includes an NFV management and orchestration (NFV MANO) system 101, an NFV infrastructure (NFVI) layer 102, a plurality of virtual network functions (VNFs) 103, a plurality of element management (EM) systems 104, and an operation-support system/business support system (OSS/BSS) 105.

The NFV MANO 101 is configured to monitor and manage the NFVI 102 and the VNF 103. The NFV management and orchestration system 101 includes an NFV orchestrator (NFVO) ion, one or more VNF managers (VNFMs) 1012, and a virtualized infrastructure manager (VIM) 1013.

The NFVO 1011 is mainly responsible for processing life cycle management on a virtualization service, allocating and scheduling virtual resources in a virtual infrastructure and the NFVI, and the like. The NFVO 1011 may also execute a resource-related request (for example, a VNFD obtaining request) from the one or more VNFMs 1012, and send configuration information (such as a VNFD, a Modify VNF Information operation, and a VNF instantiation request) to the VNFMs 1012, and collect status information of the VNF 103. The VNFD may be stored on the NFVO, or may be stored in a database managed by the NFVO, so that the NFVO may obtain the VNFD and feed back the VNFD to the VNFM, and the VNFM deploys a VNF based on the VNFD. The NFVO may store VNFDs of a plurality of VNFs with different functions. In addition, the NFVO 1011 may communicate with the VIM 1013, to allocate and/or reserve a resource, and exchange configuration and status information of a virtualized hardware resource.

The VNFM 1012 is mainly responsible for life cycle management on the one or more VNFs 103, for example, instantiating, updating, querying, scaling, and terminating the VNFs 103. The VNFM 1012 may communicate with the VNFs 103 to complete life cycle management on the VNFs 103 and exchange configuration and status information. A plurality of VNFMs 1012 may exist in the NFV system, and are responsible for performing life cycle management on VNFs of different types.

The VIM 1013 may perform resource management functions, such as a function of managing infrastructure resource allocation (for example, adding a resource to a virtual container) and an operation (for example, collecting NFVI fault information). The VNFM 1012 and the VIM 1013 may communicate with each other to allocate the resource and exchange the configuration and status information of the virtualized hardware resource, for example, control and manage interaction between the VNF 103 and computing hardware 1021, storage hardware 1022, network hardware 1023, virtual computing (virtual computing) 1024, virtual storage 1025, and a virtual network 1026.

The NFVI 102 includes a hardware resource layer, a virtualization layer, and a virtual resource layer. The NFVI 102 includes a hardware resource, a software resource, or a combination of the hardware resource and the software resource, to complete deployment of a virtualized environment. In other words, the hardware resource and the virtualization layer are used to provide a virtual resource for the VNF 103, for example, the virtual resource is used as a virtual machine or a virtual container in another form. The hardware resource layer includes the computing hardware 1021, the storage hardware 1022, and the network hardware 1023. The computing hardware 1021 may be existing hardware in the market and/or customized hardware, and is configured to provide processing and computing resources. The storage hardware 1022 may be a storage capacity provided in a network or a storage capacity of the storage hardware 1022 (a local memory in a server). In an implementation solution, resources of the computing hardware 1021 and the storage hardware 1022 may be aggregated. The network hardware 1023 may be a switch, a router, and/or any other network device that is configured to provide a switching function. The network hardware 1023 may cross a plurality of domains, and may include a plurality of networks interconnected by using one or more transport networks. The virtualization layer in the NFVI 102 may abstract a hardware resource from a physical layer and decouple from the VNF 103, to provide a virtual resource to the VNF 103. The virtual resource layer includes the virtual computing 1024, the virtual storage 1025, and the virtual network 1026. The virtual computing 1024 and the virtual storage 1025 may be provided to the VNF 103 in a form of a virtual machine and/or another virtual container. For example, the one or more VNFs 103 may be deployed on one virtual machine (VM). The virtualization layer abstracts the network hardware 1023 to form the virtual network 1026. The virtual network 1026 may include a virtual switch (virtual switch), and the virtual switch is configured to provide a connection between the virtual machine and another virtual machine. In addition, the transport network in the network hardware 1023 may be virtualized by using a centralized control plane and an independent forwarding plane (for example, a software defined network).

In terms of hardware, the computing hardware 1021, the storage hardware 1022, and the network hardware 1023 may include a plurality of subracks, a plurality of racks, or even a plurality of equipment rooms. In terms of software, there may be one VIM 1013 or a plurality of VIMs that separately manage different hardware resources.

The VNF 103 may be configured as virtualization of at least one virtual network function performed by one physical network device.

The device management system (EM) 104 is a system configured to configure and manage a device in a conventional network. In the NFV system, the EM 104 may also be configured to configure and manage the VNF 103, and initiate a life cycle management operation such as instantiation of a new VNF 103 to the VNFM 1012.

The operations support system and business support system (OSS/BSS) 105 supports various end-to-end telecommunication services. Management functions supported by the OSS include network configuration, service provision, fault management, and the like. The BSS processes an order, payment, income, or the like, and supports product management, order management, revenue management, and customer management.

In the NFV system, a virtualized network service (NS) may be a network service of an IP multimedia subsystem (IMS), a network service of a next-generation mobile core network (Evolved Packet Core, EPC), or the like. One NS may include several VNFs. When virtualization deployment is performed on one NS, a virtualization service provider needs to obtain description information of the service, namely, a network service descriptor (NSD), from a virtualization service requestor. The NSD mainly describes topology structure information of the service and description information of each included VNF, namely, a VNF descriptor (VNFD). In the topology structure information, a virtual link descriptor (VLD) may be used to describe a connection between the VNFs. The VNFD includes information such as a virtual deployment unit (Virtualisation Deployment Unit, VDU), a connection point (CP), and a virtual link (VL). The VDU can represent a virtual machine on which application software is installed. Descriptions of the VDU contain requirements on all virtual resources of the virtual machine. The CP represents connection information on the virtual machine, for example, may be virtual network interface card information. Address information of the CP may be represented by using an IP address or a media access control (MAC) address. The VL is a virtual connection that connects a plurality of VDUs in the VNFs, and may be represented by using information such as a connection type or bandwidth.

In this application, a topology and orchestration specification for cloud applications (TOSCA) may be used to describe the VNFD. The TOSCA is a description specification developed by the Advancing Open Standards for the Information Society (OASIS).

In some embodiments, information required for deploying an application may be described in an application deployment package. The application deployment package includes at least one application deployment description file whose suffix is ste. The application deployment description file with *.ste may describe deployment information of an application by using an extensible markup language (XML) language. A root element of the application deployment description file with *.ste is a service template. That is, in the embodiments of this application, the service template may be used to completely describe information about an application that needs to be deployed. Sub-elements of the application deployment description file with *.ste include a topology template (TopologyTemplate), a node type (NodeType), a node template (NodeTemplate), a relationship type (RelationshipType), a relationship template (RelationshipTemplate), a boundary definition (BoundaryDefinitions), and the like.

For example, an example of a topology template in a VNFD defined in a conventional technology is as follows:

```
tosca_definitions_version: tosca_simple_yaml_1_0
description: vCPE_vgw
imports:
    - onap_dm.yaml
topology_template:
    inputs:         # Input parameter, where a value is input as required during deployment
        vcpe_image_name:
            type: string
            description: image name for vcpe in openstack glance
            default: ubuntu_16.04
        public_net_id:
            type: string
            description: public network id used during onap installation
        vgw_name_0:
            type: string
            description: Name of the vGW
            default: zdcpe1cpe01gw01
```

It can be learned from the VNFD that a vCPE service deployment template is defined. In the topology template, input parameters (such as "vcpe_image_name", "public_net_id", and "vgw_name_o") defined in "inputs" are dynamic parameters. Values of these input parameters can be determined only during deployment, for example, may be carried in a VNF instantiation request.

Because requirements of VNFs are different, input parameters included in VNFDs corresponding to different VNFs are also different. To facilitate adaptation of all input parameters of different VNFs into the VNF instantiation request, an NFV standard of the ETSI specifies that all service-related dedicated parameters in the input parameters are defined as a modifiable attributes parameter ("modifiable_attributes"). It may be understood that the dedicated parameter is a service-related parameter. For different services, dedicated parameters may be completely different or may be partially different. Therefore, the inputs parameters include a common parameter and a modifiable attribute parameter that are related to all VNFs.

For example, an example of a topology template in a VNFD defined in a conventional technology is as follows:

```
topology_template:
    inputs:         # Input parameter, where a value is input as required during deployment
        flavour:    # Common parameter
            type: string
        instantiation_level:   # Common parameter
            type: string
        modifiable_attributes:    # Modifiable attributes parameter
            type: mycompany.datatypes.nfv.VnfInfoModifiableAttributes
```

It can be learned from the defined topology template that "flavour" and "instantiation_level" are common parameters. Values of the common parameters may be carried in the VNF instantiation request, and are notified to the virtualization service provider by the virtualization service requestor. In this way, the VNF instantiation request needs to carry only the values of the common parameters and the modifiable attributes parameter. Because requirements of VNFs are different, the modifiable attributes parameter may be extended based on requirements of different VNFs. The modifiable attributes parameter includes service-related dedicated parameters, such as "vcpe_image_name", "public_net_id", and "vgw_name_o" in the foregoing example. A Modify VNF Information operation may be used to assign a value to or modify a value of the dedicated parameter, and is notified to the virtualization service provider by the virtualization service requestor.

Although the virtualization service provider may learn of the value of the modifiable attributes parameter by using the Modify VNF Information operation, a conventional technology does not include a solution for assigning a value to a modifiable attributes parameter in the VNFD by using the value of the modifiable attributes parameter included in the Modify VNF Information operation. Therefore, the virtualization service provider can assign a value to only a common parameter in the VNFD by using the value of the common parameter included in the VNF instantiation request, but cannot assign a value to the modifiable attributes parameter in the VNFD. As a result, VNF deployment fails.

An embodiment of this application provides a VNF deployment method. The method includes separately setting indication information of a common parameter and dedicated parameter in a VNFD, to indicate a source of a value of the common parameter and a source of a value of the dedicated parameter, where the common parameter and the dedicated parameter are included in input parameters. When assigning values to the common parameter and the dedicated parameter, a virtualization service provider obtains the value of the common parameter based on the indication information of the common parameter, and obtains the value of the dedicated parameter based on the indication information of the dedicated parameter. Therefore, the virtualization service provider can assign values to the common parameter and a modifiable attributes parameter in the VNFD, so that values are assigned to all input parameters in the VNFD, and the VNF is successfully deployed.

In this application, a virtualization service requestor may be user equipment. For example, the virtualization service requestor may be an NFVO or an OSS/a BSS. The virtualization service provider may be an application deployment server. For example, the virtualization service provider may be a VNFM.

An example in which the virtualization service requestor is the NFVO and the virtualization service provider is the VNFM is used below to describe an implementation of the embodiments of this application in detail with reference to the accompanying drawings.

Figure 2:
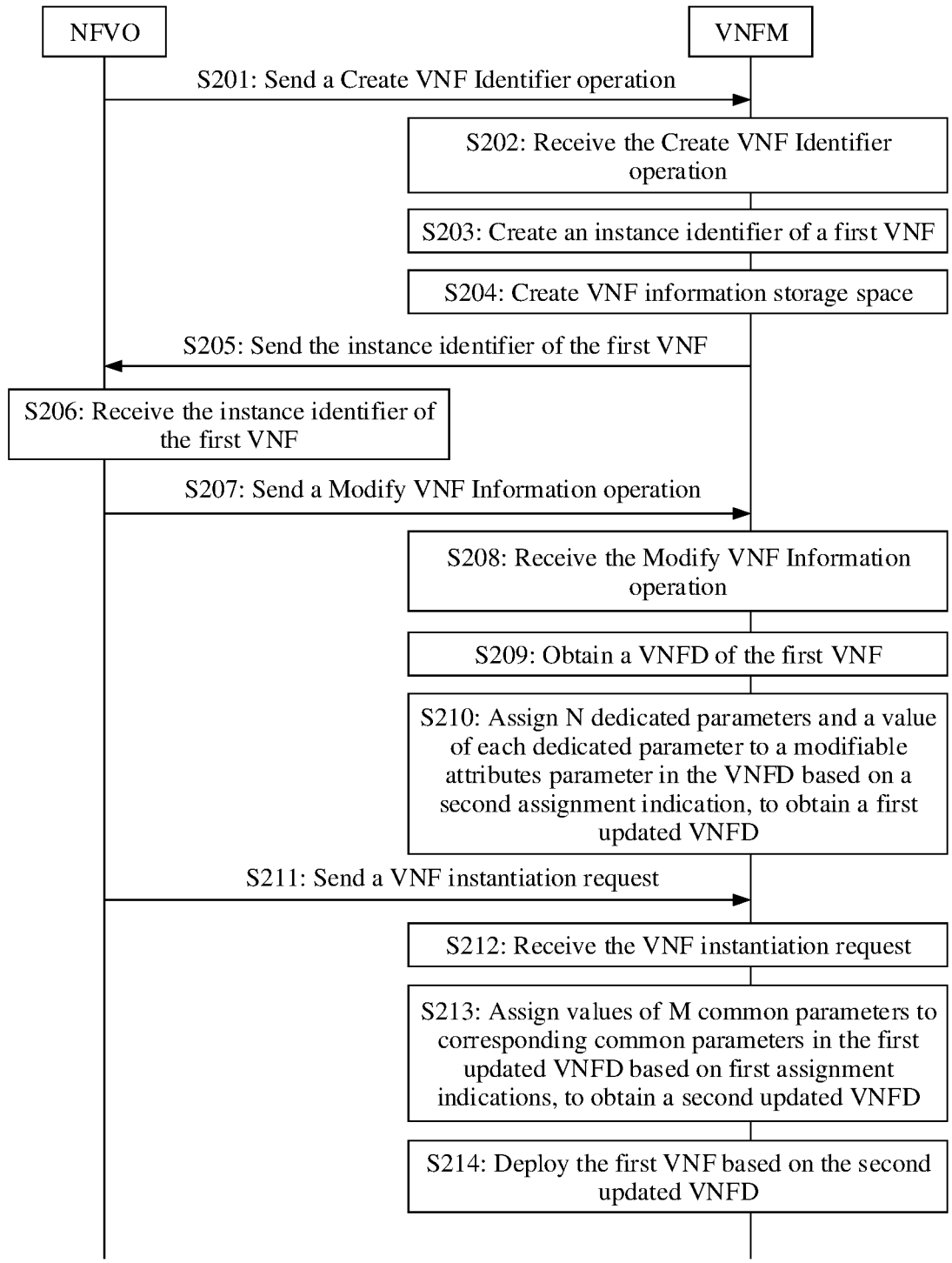
FIG. 2 is a flowchart of a VNF deployment method according to this application.

FIG. 2 is a flowchart of a VNF deployment method according to an embodiment of this application. As shown in FIG. 2, the method may include the following steps.

S201: An NFVO sends a Create VNF Identifier operation to a VNFM.

The Create VNF Identifier operation is used to request to create an instance identifier for a VNF that needs to be deployed.

S202: The VNFM receives the Create VNF Identifier operation sent by the NFVO.

After receiving the Create VNF Identifier operation sent by the NFVO, the VNFM may send a receiving response to the NFVO, to notify the NFVO that the Create VNF Identifier operation has been successfully received. In addition, the VNFM performs S203 and S204.

S203: The VNFM creates an instance identifier of a first VNF.

After receiving the Create VNF Identifier operation sent by the NFVO, the VNFM creates the instance identifier of the first VNF. The Create VNF Identifier operation includes an identifier of a VNFD of the first VNF. The VNFM may further establish a correspondence between the instance identifier of the first VNF and the identifier of the VNFD of the first VNF.

S204: The VNFM creates VNF information storage space.

The VNF information storage space is used to store information related to VNF deployment. The information related to the VNF deployment may include input parameters (for example, a common parameter and a modifiable attributes parameter) of the VNF, a VLD, a VDU, a CP, a VL, and the like. In this application, VNF information storage space corresponding to the instance identifier of the first VNF may be created, and is used to store information related to deployment of the first VNF.

S205: The VNFM sends the instance identifier of the first VNF to the NFVO.

It should be noted that a sequence of the steps in the VNF deployment method provided in this embodiment of this application may be properly adjusted, or a step may be correspondingly added or deleted based on a situation. For example, a sequence of S204 and S205 may be changed. That is, S205 may be first performed, and S204 is then performed. Any method that can be easily figured out by a person skilled in the art within the technical scope disclosed in this application shall fall within the protection scope of this application. Therefore, details are not described again.

S206: The NFVO receives the instance identifier of the first VNF sent by the VNFM.

After receiving the instance identifier of the first VNF sent by the VNFM, the NFVO stores the instance identifier of the first VNF, and may send a receiving response to the VNFM, to notify the VNFM that the instance identifier of the first VNF has been successfully received.

S207: The NFVO sends a Modify VNF Information operation to the VNFM.

The Modify VNF Information operation includes a modifiable attributes parameter. The modifiable attributes parameter includes N dedicated parameters and a value of each dedicated parameter, the N dedicated parameters and the value of each dedicated parameter are parameters required for instantiating the first VNF, N is an integer, and N≥1.

For example, a description example of the modifiable attributes parameter provided in this application is as follows:

---
modifiable_attribute:
    vcpe_image_name = image123
    public_net_id = 123456
    vgw_name_0 = vgw123

---

The modifiable attributes parameter includes three dedicated parameters and a value of each dedicated parameter. The three dedicated parameters are "vcpe_image_name", "public_net_id", and "vgw_name_o". The value of "vcpe_image_name" is "image123". The value of "public_net_id" is "123456". The value of "vgw_name_o" is "vgw123".

The Modify VNF Information operation further includes the instance identifier of the first VNF, so that the VNFM stores, based on the instance identifier of the first VNF, the N dedicated parameters and the value of each dedicated parameter into the VNF information storage space corresponding to the instance identifier of the first VNF. The instance identifier of the first VNF is notified by the VNFM to the NFVO in advance.

S208: The VNFM receives the Modify VNF Information operation sent by the NFVO.

After receiving the Modify VNF Information operation sent by the NFVO, the VNFM may store the N dedicated parameters and the value of each dedicated parameter that are included in the modifiable attributes parameter into the VNF information storage space corresponding to the instance identifier of the first VNF. In addition, the VNFM may send a receiving response to the NFVO, to notify the NFVO that the Modify VNF Information operation has been successfully received.

S209: The VNFM obtains the VNFD of the first VNF.

In some embodiments, the VNFM may send a VNFD obtaining request to the NFVO. The VNFD obtaining request includes the identifier of the VNFD of the first VNF. The identifier of the VNFD of the first VNF is notified by the NFVO to the VNFM in advance. The NFVO stores VNFDs of VNFs of different functions. After receiving the VNFD obtaining request, the NFVO may obtain the VNFD of the first VNF based on the identifier of the VNFD of the first VNF, and send a VNFD response to the VNFM. The VNFD response includes the VNFD of the first VNF. After obtaining the VNFD of the first VNF, the VNFM sends a receiving response to the NFVO, to notify the NFVO that the VNFD of the first VNF has been successfully received.

Specifically, the VNFD of the first VNF includes M common parameters, the modifiable attributes parameter, M first assignment indications, and one second assignment indication. One of the first assignment indications is used to indicate to obtain a value of one common parameter from a virtualization service requestor. The M first assignment indications indicate sources of the values of the M common parameters. The second assignment indication is used to indicate to obtain a value of the modifiable attributes parameter from a virtualization service provider. M is an integer, and Mi.

For example, an example of a topology template in the VNFD of the first VNF provided in this application is as follows:

```
topology_template:
    inputs:       # Input parameter, where a value is input as required during deployment
        flavour:
            type: string
            source: user   # First assignment indication
        instantiation_level:
            type: string
            source: user   # First assignment indication
        modifiable_attributes:
            type: mycompany.datatypes.nfv.VnfInfoModifiableAttributes
            source: VNFM    # Second assignment indication
```

It can be learned from the topology template in the VNFD that a "source" field is added under the modifiable attributes parameter and each common parameter, to indicate sources of values of the input parameters.

For example, the first assignment indication may be "source: user". "source: user" in the common parameter "flavour" is used to indicate to obtain a value of "flavour" from the virtualization service requestor (for example, the user (user)). "source: user" in the common parameter "instantiation_level" is used to indicate to obtain a value of "instantiation_level" from the virtualization service requestor (for example, the user (user)). The user may be an OSS or a BSS. In some designs, the virtualization service requestor sends a VNF instantiation request to the virtualization service provider. The VNF instantiation request carries the common parameters and the values of the common parameters. In this embodiment, the VNFM may obtain the value of "flavour" from the VNF instantiation request and assign the value to "flavour". The VNFM may obtain the value of "instantiation_level" from the VNF instantiation request and assign the value to "instantiation_level".

For another example, the virtualization service requestor may alternatively be an NFVO. The first assignment indication may be "source: NFVO".

For example, an example of another topology template in the VNFD of the first VNF provided in this application is as follows:

```
topology_template:
    inputs:       # Input parameter, where a value is input as required during deployment
        flavour:
            type: string
            source: user   # First assignment indication
        instantiation_level:
            type: string
            source: user   # First assignment indication
        vimConnectionInfo:
            type: string
            description: VNF instantiation level
            source: NFVO   # First assignment indication
        modifiable_attributes:
            type: mycompany.datatypes.nfv.VnfInfoModifiableAttributes
            source: VNFM    # Second assignment indication
```

"source: NFVO" in the common parameter "vimConnectionInfo" is used to indicate to obtain a value of "vimConnectionInfo" from the virtualization service requestor (the NFVO). In this embodiment, the VNFM may obtain the value of "vimConnectionInfo" from the VNF instantiation request and assign the value to "vimConnectionInfo".

The second assignment indication may be "source: VNFM". "source: VNFM" in the modifiable attributes parameter is used to indicate to obtain a value of the modifiable attributes parameter from the virtualization service provider (for example, the VNFM). The VNFM may obtain the value of the modifiable attributes parameter from the Modify VNF Information operation, and assign the value to the modifiable attributes parameter.

It should be noted that the first assignment indications and the second assignment indication may be set during VNFD design. After receiving the VNFD, the NFVO and the VNFM may determine, based on the first assignment indications and the second assignment indication, whether values need to be assigned to corresponding parameters.

In addition, the VNFD of the first VNF may further include other information related to the deployment of the first VNF, such as a VDU, a CP, and a VL. For specific explanations, refer to an existing technology. This is not limited in this application.

S210: The VNFM assigns the N dedicated parameters and the value of each dedicated parameter to the modifiable attributes parameter in the VNFD based on the second assignment indication, to obtain a first updated VNFD.

After obtaining the VNFD of the first VNF, the VNFM parses the VNFD of the first VNF, and determines, based on a first assignment indication, that the source of the value of the common parameter in the VNFD of the first VNF is the NFVO or the OSS/BSS. In this case, the VNFM has not obtained the value of the common parameter. Therefore, the value cannot be assigned to the common parameter, and the VNFD of the first VNF does not need to be updated. Further, the VNFM determines, based on the second assignment indication, that the source of the value of the modifiable attributes parameter in the VNFD of the first VNF is the VNFM. Because the VNFM prestores the N dedicated parameters and the value of each dedicated parameter that are included in the modifiable attributes parameter, the VNFM obtains the N dedicated parameters and the value of each dedicated parameter from the VNF information storage space corresponding to the instance identifier of the first VNF, and assigns the N dedicated parameters and the value of each dedicated parameter to the modifiable attributes parameter in the VNFD of the first VNF, to obtain the first updated VNFD.

For example, it is assumed that the modifiable attributes parameter stored in the VNF information storage space corresponding to the instance identifier of the first VNF includes the following dedicated parameters and values of the dedicated parameters, including "vcpe_image_name", "public_net_id", "vgw_name_o", the value "image123" of "vcpe_image_name", the value "123456" of "public_net_id", and the value "vgw123" of "vgw_name_o". The VNFM assigns "vcpe_image_name", "public_net_id", "vgw_name_o", the value "image123" of "vcpe_image_name", the value "123456" of "public_net_id", and the value "vgw123" of "vgw_name_o" to the modifiable attributes parameter in the VNFD of the first VNF based on the second assignment indication, to obtain the first updated VNFD. The modifiable attributes parameter stored in the VNF information storage space corresponding to the instance identifier of the first VNF is as follows:

```
modifiable_attribute:
    vcpe_image_name = image123
    public_net_id = 123456
    vgw_name_0 = vgw123
```

The first updated VNFD is as follows:

```
topology_template:
    inputs:         # Input parameter, where a value is input as required during deployment
        flavour:
            type: string
            source: user   # First assignment indication
        instantiation_level:
            type: string
            source: user   # First assignment indication
        modifiable_attributes:
            vcpe_image_name = image123
            public_net_id = 123456
            vgw_name_0 = vgw123
```

It should be noted that the VNFM may determine whether values are assigned to all input parameters in the first updated VNFD. If the values are not assigned to all the input parameters in the first updated VNFD, the VNFM first stores the first updated VNFD. Optionally, in this application, the VNFM may alternatively convert a VNFD file, obtained after the value is assigned to the modifiable attributes parameter, into any other file suitable for machine processing, for example, with a format such as JSON or XML, and save the file. This is not limited in this application.

S211: The NFVO sends the VNF instantiation request to the VNFM.

The VNF instantiation request includes the instance identifier of the first VNF, the M common parameters, and the value of each common parameter. The instance identifier of the first VNF is notified by the VNFM to the NFVO in advance. The M common parameters and the value of each common parameter are parameters required for instantiating the first VNF.

For example, the VNF instantiation request includes two common parameters and a value of each common parameter. The two common parameters may be "flavour" and "instantiation_level". The value of "flavour" is "flavour-1". The value of "instantiation_level" is "level-1".

In some embodiments, the value of the common parameter may be assigned by the OSS/BSS to the common parameter.

In some other embodiments, before the NFVO sends the VNF instantiation request to the VNFM, the NFVO may further assign a proper value to a common parameter whose source in the VNFD is the NFVO, and include the proper value in the VNF instantiation request.

For example, if "source" of "vimConnectionInfo" in the input parameters is "NFVO", the NFVO needs to assign a value to "vimConnectionInfo". For example, the value assigned by the NFVO to "vimConnectionInfo" is "10.2.2.2". In this case, content carried in the VNF instantiation request includes "flavour", "instantiation_level", "vimConnectionInfo", the value "flavour-1" of "flavour", the value "level-1" of "instantiation_level", and the value "10.2.2.2" of "vimConnectionInfo".

5212: The VNFM receives the VNF instantiation request sent by the NFVO.

After receiving the VNF instantiation request sent by the NFVO, the VNFM may send a receiving response to the NFVO, to notify the NFVO that the Modify VNF Information operation has been successfully received.

S213: The VNFM assigns the values of the M common parameters to corresponding common parameters in the first updated VNFD based on the first assignment indications, to obtain a second updated VNFD.

The VNFM may first perform querying based on the instance identifier of the first VNF to determine the correspondence between the instance identifier of the first VNF and the identifier of the VNFD of the first VNF, determine the identifier of the VNFD of the first VNF associated with the instance identifier of the first VNF, and determine the VNFD of the first VNF based on the identifier of the VNFD of the first VNF. Then, the VNFM determines, based on the first assignment indications, that the sources of the values of the common parameters in the VNFD of the first VNF are the user (OSS/BSS) or/and the NFVO. The VNFM assigns the values of the M common parameters to the corresponding common parameters in the VNFD of the first VNF, to obtain the second updated VNFD.

For example, the content carried in the VNF instantiation request includes "flavour", "instantiation_level", the value "flavour-1" of "flavour", and the value "level-1" of "instantiation_level".

The value "flavour-1" is assigned to "flavour" in the VNFD of the first VNF. The value "level-1" of "instantiation_level" is assigned to "instantiation_level" in the VNFD of the first VNF. A topology template in the second updated VNFD is as follows:

```
topology_template:
    inputs:
        flavour: flavour-1
        instantiation_level: level-1
        modifiable_attribute:
            vcpe_image_name = image123
            public_net_id = 123456
            vgw_name_0 = vgw123
```

For another example, the content carried in the VNF instantiation request includes "flavour", "instantiation_level", "vimConnectionInfo", the value "flavour-1" of "flavour", the value "level-1" of "instantiation_level", and the value "10.2.2.2" of "vimConnectionInfo".

"source" of "vimConnectionInfo" is "NFVO". The NFVO needs to assign "10.2.2.2" to "vimConnectionInfo". Therefore, the VNFM assigns the value "flavour-1" of "flavour" to "flavour" in the VNFD of the first VNF, assigns the value "level-1" of "instantiation_level" to "instantiation_ level" in the VNFD of the first VNF, and assigns the value "10.2.2.2" of "vimConnectionInfo" to "vimConnectionInfo" in the VNFD of the first VNF. A topology template in the second updated VNFD is as follows:

```
topology_template:
    inputs:
        flavour: flavour-1
        instantiation_level: level-1
        vimConnectionInfo: 10.2.2.2
        modifiable_attribute:
            vcpe_image_name = image123
            public_net_id = 123456
            vgw_name_0 = vgw123
```

In this case, values are assigned to all input parameters in the VNFD of the first VNF.

The VNFM may deploy the first VNF by parsing the VNFD file. The VNFM performs S214.

S214: The VNFM deploys the first VNF based on the second updated VNFD.

The VNFM may determine whether values are assigned to all input parameters in the second updated VNFD. If the values are assigned to all the input parameters in the second updated VNFD, the VNFM deploys the first VNF based on the second updated VNFD.

It should be noted that when the first VNF is deployed, a get_input function may be used to assign a value of an input parameter ("inputs") to a specific parameter. An example is shown below:

```
VL_public:
    type: tosca.nodes.nfv.VnfVirtualLink
    properties:
        connectivity_type:
            layer_protocol: ipv4
        vl_profile:
            networkName: {get_input: public_net_id}
```

A value of "networkName" is equal to a value of the input parameter "public_net_id". The VNF instantiation request carries the value of the parameter "public_net_id".

Another example is shown below:

```
LLU_VNF:
    type: tosca.nodes.nfv.VNF
    properties:
        flavour_id: {get_input: flavour}
        descriptor_id: b1bb0ce7-2222-4fa7-95ed-4840d70a1177
        modifiable_attributes: {get_input: modifiable_attributes}
```

A value of "flavour_id" is equal to the value of the input parameter "flavour". The VNF instantiation request carries the value of the parameter "flavour". A value of "modifiable attributes" is equal to the value of the input parameter "modifiable_attributes". The Modify VNF Information operation carries the value of the parameter "modifiable_attributes".

For other steps related to the VNF deployment, refer to descriptions in the existing technology. Details are not described in this application.

According to the VNF deployment method provided in this embodiment of this application, the virtualization service provider can obtain the value of the modifiable attributes parameter from the VNF information storage space, and assign the value to the modifiable attributes parameter in the VNFD, so that values are assigned to all input parameters in the VNFD, and the VNF is successfully deployed.

In some other embodiments, the VNFM may alternatively obtain a VNFD after receiving a VNF instantiation request, to avoid storing a VNFD obtained after a value is assigned to only a modifiable attributes parameter. Therefore, storage resource overheads are reduced.

Figure 3:
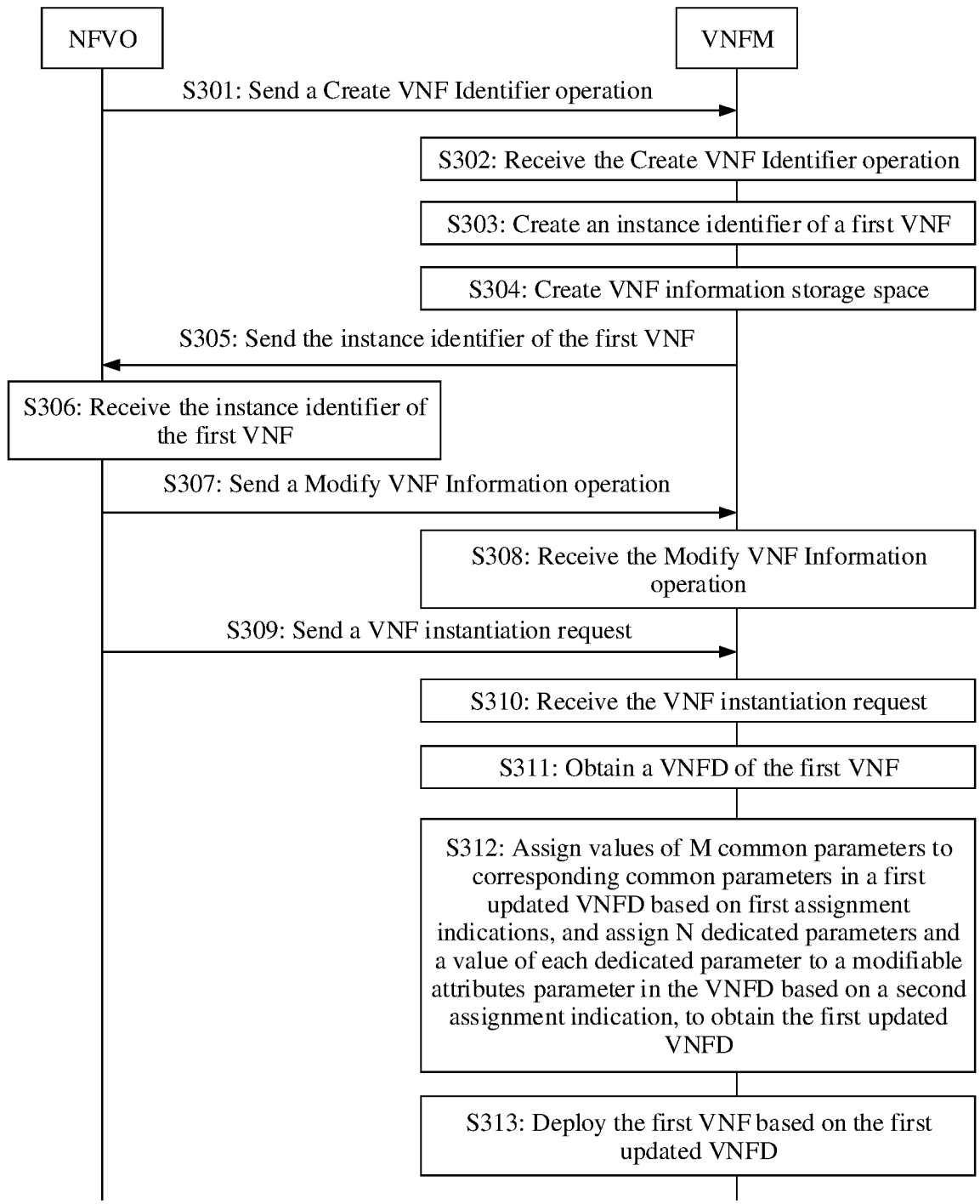
FIG. 3 is a flowchart of another VNF deployment method according to this application.

FIG. 3 is a flowchart of a VNF deployment method according to an embodiment of this application. As shown in FIG. 3, the method may include the following steps.

S301: An NFVO sends a Create VNF Identifier operation to a VNFM.

S302: The VNFM receives the Create VNF Identifier operation sent by the NFVO.

S303: The VNFM creates an instance identifier of a first VNF.

S304: The VNFM creates VNF information storage space.

S305: The VNFM sends the instance identifier of the first VNF to the NFVO.

S306: The NFVO receives the instance identifier of the first VNF sent by the VNFM.

S307: The NFVO sends a Modify VNF Information operation to the VNFM.

S308: The VNFM receives the Modify VNF Information operation sent by the NFVO.

For explanations of S301 to S308, refer to the descriptions of S201 to S208. Details are not described again.

S309: The NFVO sends a VNF instantiation request to the VNFM.

The VNF instantiation request includes the instance identifier of the first VNF, M common parameters, and a value of each common parameter. The instance identifier of the first VNF is notified by the VNFM to the NFVO in advance. The M common parameters and the value of each common parameter are parameters required for instantiating the first VNF.

For example, the VNF instantiation request includes two common parameters and a value of each common parameter. The two common parameters are "flavour" and "instantiation_level". The value of "flavour" is "flavour-1". The value of "instantiation_level" is "level-1".

In some embodiments, the value of the common parameter may be assigned by an OSS/a BSS to the common parameter.

In some other embodiments, before the NFVO sends the VNF instantiation request to the VNFM, the NFVO may further assign a proper value to a common parameter whose source in a VNFD is the NFVO, and include the proper value in the VNF instantiation request.

For example, if "source" of "vimConnectionInfo" in input parameters is "NFVO", the NFVO needs to assign a value to "vimConnectionInfo". For example, the value assigned by the NFVO to "vimConnectionInfo" is "10.2.2.2". In this case, content carried in the VNF instantiation request includes "flavour", "instantiation_level", "vimConnectionInfo", the value "flavour-1" of "flavour", the value "level-1" of "instantiation_level", and the value "10.2.2.2" of "vimConnectionInfo".

S310: The VNFM receives the VNF instantiation request sent by the NFVO.

After receiving the VNF instantiation request sent by the NFVO, the VNFM may send a receiving response to the NFVO, to notify the NFVO that the Modify VNF Information operation has been successfully received.

S311: The VNFM obtains a VNFD of the first VNF.

In some embodiments, the VNFM may send a VNFD obtaining request to the NFVO. The VNFD obtaining request includes an identifier of the VNFD of the first VNF. The identifier of the VNFD of the first VNF is notified by the NFVO to the VNFM in advance. After receiving the VNFD obtaining request, the NFVO obtains the VNFD of the first VNF based on the identifier of the VNFD of the first VNF, and sends a VNFD response to the VNFM. The VNFD response includes the VNFD of the first VNF. After obtaining the VNFD of the first VNF, the VNFM sends a receiving response to the NFVO, to notify the NFVO that the VNFD of the first VNF has been successfully received.

Specifically, the VNFD of the first VNF includes the M common parameters, a modifiable attributes parameter, M first assignment indications, and a second assignment indication. One of the first assignment indications is used to indicate to obtain a value of one common parameter from a virtualization service requestor. The M first assignment indications indicate sources of values of the M common parameters. The second assignment indication is used to indicate to obtain a value of the modifiable attributes parameter from a virtualization service provider. M is an integer, and Mi.

For example, an example of a topology template in the VNFD of the first VNF provided in this application is as follows:

```
topology_template:
    inputs:        # Input parameter, where a value is input as required during deployment
        flavour:
            type: string
            source: user   # First assignment indication
        instantiation_level:
            type: string
            source: user   # First assignment indication
        modifiable_attributes:
            type: mycompany.datatypes.nfv.VnfInfoModifiableAttributes
            source: VNFM   # Second assignment indication
```

It can be learned from the topology template in the VNFD that a "source" field is added under the modifiable attributes parameter and each common parameter, to indicate sources of values of the input parameters.

For example, the first assignment indication may be "source: user". "source: user" in the common parameter "flavour" is used to indicate to obtain the value of "flavour" from the virtualization service requestor (for example, the user (user)). "source: user" in the common parameter "instantiation_level" is used to indicate to obtain the value of "instantiation_level" from the virtualization service requestor (for example, the user (user)). The user may be the OSS or the BSS. In some designs, the virtualization service requestor sends the VNF instantiation request to the virtualization service provider. The VNF instantiation request carries the common parameters and the values of the common parameters. In this embodiment, the VNFM may obtain the value of "flavour" from the VNF instantiation request and assign the value to "flavour". The VNFM may obtain the value of "instantiation_level" from the VNF instantiation request and assign the value to "instantiation_level".

For another example, the virtualization service requestor may alternatively be the NFVO. The first assignment indication may be "source: NFVO".

For example, an example of another topology template in the VNFD of the first VNF provided in this application is as follows:

```
topology_template:
    inputs:        # Input parameter, where a value is input as required during deployment
        flavour:
            type: string
            source: user   # First assignment indication
        instantiation_level:
            type: string
            source: user   # First assignment indication
```

```
vimConnectionInfo:
    type: string
    description: VNF instantiation level
    source: NFVO   # First assignment indication
modifiable_attributes:
    type: mycompany.datatypes.nfv.VnfInfoModifiableAttributes
    source: VNFM   # Second assignment indication
```

"source: NFVO" in the common parameter "vimConnectionInfo" is used to indicate to obtain the value of "vimConnectionInfo" from the virtualization service requestor (NFVO). In this embodiment, the VNFM may obtain the value of "vimConnectionInfo" from the VNF instantiation request and assign the value to "vimConnectionInfo".

The second assignment indication may be "source: VNFM". "source: VNFM" in the modifiable attributes parameter is used to indicate to obtain the value of the modifiable attributes parameter from the virtualization service provider (for example, the VNFM). The VNFM may obtain the value of the modifiable attributes parameter from the Modify VNF Information operation, and assign the value to the modifiable attributes parameter.

It should be noted that the first assignment indications and the second assignment indication may be set during VNFD design. After receiving the VNFD, the NFVO and the VNFM may determine, based on the first assignment indications and the second assignment indication, whether values need to be assigned to corresponding parameters.

In addition, the VNFD of the first VNF may further include other information related to deployment of the first VNF, such as a VDU, a CP, and a VL. For specific explanations, refer to an existing technology. This is not limited in this application.

S312: The VNFM assigns the values of the M common parameters to corresponding common parameters in a first updated VNFD based on the first assignment indications, and assigns the N dedicated parameters and the value of each dedicated parameter to the modifiable attributes parameter in the VNFD based on the second assignment indication, to obtain the first updated VNFD.

The VNFM parses the VNFD of the first VNF, and determines, based on the first assignment indications, that sources of the values of the common parameters in the VNFD of the first VNF are the user (OSS/BSS) or/and the NFVO. The VNFM assigns the values of the M common parameters to the corresponding common parameters in the VNFD of the first VNF. The VNFM determines, based on the second assignment indication, that a source of the value of the modifiable attributes parameter in the VNFD of the first VNF is the VNFM. Because the VNFM prestores the N dedicated parameters and the value of each dedicated parameter that are included in the modifiable attributes parameter, the VNFM obtains the N dedicated parameters and the value of each dedicated parameter from the VNF information storage space corresponding to the instance identifier of the first VNF, and assigns the N dedicated parameters and the value of each dedicated parameter to the modifiable attributes parameter in the VNFD of the first VNF, to obtain the first updated VNFD.

For example, the content carried in the VNF instantiation request includes "flavour", "instantiation_level", the value "flavour-1" of "flavour", and the value "level-1" of "instantiation_level". The VNFM assigns the value "flavour-1" of "flavour" to "flavour" in the VNFD of the first VNF, and assigns the value "level-1" of "instantiation_level" to "instantiation_level" in the VNFD of the first VNF.

Further, it is assumed that the modifiable attributes parameter stored in the VNF information storage space corresponding to the instance identifier of the first VNF includes the following dedicated parameters and values of the dedicated parameters, including "vcpe_image_name", "public_net_id", "vgw_name_o", a value "imagei23" of "vcpe_image_name", a value "123456" of "public_net_id", and a value "vgw123" of "vgw_name_o". The VNFM assigns "vcpe_image_name", "public_net_id", "vgw_name_o", the value "image123" of "vcpe_image_name", the value "123456" of "public_net_id", and the value "vgw123" of "vgw_name_o" to the modifiable attributes parameter in the VNFD of the first VNF based on the second assignment indication, to obtain the first updated VNFD. The modifiable attributes parameter stored in the VNF information storage space corresponding to the instance identifier of the first VNF is as follows:

```
modifiable_attribute:
    vcpe_image_name = image123
    public_net_id = 123456
    vgw_name_0 = vgw123
```

The first updated VNFD is as follows:

```
topology_template:
    inputs:
        flavour: flavour-1
        instantiation_level: level-1
        modifiable_attribute:
            vcpe_image_name = image123
            public_net_id = 123456
            vgw_name_0 = vgw123
```

In some embodiments, the VNFD includes the parameter "vimConnectionInfo". The content carried in the VNF instantiation request includes "vimConnectionInfo" and the value "10.2.2.2" of "vimConnectionInfo". The VNFM further needs to assign the value "10.2.2.2" of "vimConnectionInfo" to "vimConnectionInfo" in the VNFD of the first VNF. "source" of "vimConnectionInfo" is "NFVO", and the value "10.2.2.2" of "vimConnectionInfo" is assigned by the NFVO to "vimConnectionInfo".

The first updated VNFD is as follows:

```
topology_template:
    inputs:
        flavour: flavour-1
        instantiation_level: level-1
        vimConnectionInfo: 10.2.2.2
        modifiable_attribute:
            vcpe_image_name = image123
            public_net_id = 123456
            vgw_name_0 = vgw123
```

In this case, values are assigned to all input parameters in the VNFD of the first VNF. The VNFM may deploy the first VNF by parsing the VNFD file. The VNFM performs S313. For other specific explanations of S312, refer to the explanations of S210 and S213. Details are not described again.

S313: The VNFM deploys the first VNF based on the first updated VNFD.

The VNFM may determine whether values are assigned to all input parameters in the first updated VNFD. If the values are assigned to all the input parameters in the first updated VNFD, the VNFM deploys the first VNF based on the first updated VNFD. For a specific explanation, refer to the explanations of S214. Details are not described again.

According to the VNF deployment method provided in this embodiment of this application, the virtualization service provider can obtain the value of the modifiable attributes parameter from the VNF information storage space, and assign the value to the modifiable attributes parameter in the VNFD, so that values are assigned to all input parameters in the VNFD, and the VNF is successfully deployed.

In the foregoing embodiments provided in this application, the method provided in the embodiments of this application is separately described from a perspective of interaction between nodes (the VNFM and the NFVO). It may be understood that, to implement functions in the method provided in the embodiments of this application, each network element, such as the VNFM and the NFVO, includes a corresponding hardware structure and/or software module for performing the functions. A person skilled in the art should easily be aware that, in combination with algorithm steps of the examples described in the embodiments disclosed in this specification, this application can be implemented by using hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the VNFM and the NFVO may be divided into function modules based on the foregoing method examples. For example, function modules may be obtained through division based on corresponding functions, or two or more functions may be integrated into one processing module. The integrated module may be implemented in a form of hardware, or may be implemented in a form of a software function module. It should be noted that, in the embodiments of this application, division into the modules is an example, and is merely a logical function division. During actual implementation, another division manner may be used.

Figure 4:
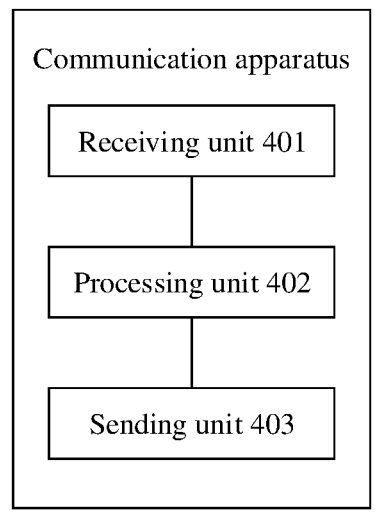
FIG. 4 is a schematic composition diagram of a communication apparatus according to this application.

When various function modules are obtained through division based on various corresponding functions, FIG. 4 is a possible schematic composition diagram of the communication apparatus in the foregoing embodiments. The communication apparatus can perform a step performed by the VNFM or the NFVO in any one of the method embodiments of this application. The communication apparatus may include a receiving unit 401, a processing unit 402, and a sending unit 403.

When the communication apparatus is a VNFM or a communication apparatus that supports the VNFM in implementing the method provided in the embodiments, the communication apparatus may be, for example, a chip system.

The receiving unit 401 is configured to support the communication apparatus in performing the method described in the embodiments of this application. For example, the receiving unit 401 is configured to perform or support the communication apparatus in performing S202, S208, and S212 in the method shown in FIG. 2, and S302, S308, and S310 in the method shown in FIG. 3.

The processing unit 402 is configured to perform or support the communication apparatus in performing S203, S204, S210, S213, and S214 in the method shown in FIG. 2, and S303, S304, S312, and S313 in the method shown in FIG. 3.

The sending unit 403 is configured to perform or support the communication apparatus in performing S205 in the method shown in FIG. 2 and S305 in the method shown in FIG. 3.

When the communication apparatus is an NFVO or a communication apparatus that supports the NFVO in implementing the method provided in the embodiments, the communication apparatus may be, for example, a chip system.

The receiving unit 401 is configured to support the communication apparatus in performing the method described in the embodiments of this application. For example, the receiving unit 401 is configured to perform or support the communication apparatus in performing S206 in the method shown in FIG. 2 and S306 in the method shown in FIG. 3.

The sending unit 403 is configured to perform or support the communication apparatus in performing S201, S207, and S211 in the method shown in FIG. 2, and S301, S307, and S309 in the method shown in FIG. 3.

It should be noted that all related content of the steps in the foregoing method embodiments may be cited in function descriptions of corresponding function modules. Details are not described herein again.

The communication apparatus provided in this embodiment of this application is configured to perform the method in any one of the foregoing embodiments, and therefore can achieve same effects as the method in the foregoing embodiments.

Figure 5:
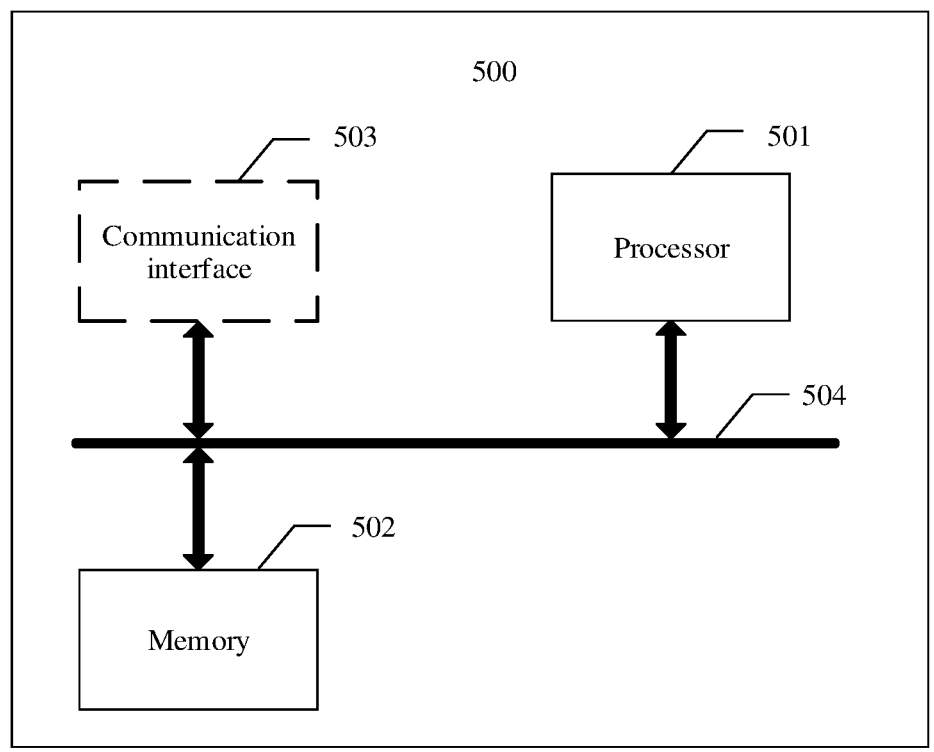
FIG. 5 is a schematic composition diagram of another communication apparatus according to this application.

FIG. 5 shows a communication apparatus 500 according to an embodiment of this application. The communication apparatus 500 is configured to implement a function of the VNFM in the foregoing methods. The communication apparatus 500 may be a VNFM, or may be an apparatus in the VNFM. The communication apparatus 500 may be a chip system. In this embodiment of this application, the chip system may include a chip, or may include a chip and another discrete component. Alternatively, the communication apparatus 500 is configured to implement a function of the NFVO in the foregoing methods. The communication apparatus 500 may be an NFVO, or may be an apparatus in the NFVO. The communication apparatus 500 may be a chip system. In this embodiment of this application, the chip system may include a chip, or may include a chip and another discrete component.

The communication apparatus 500 includes at least one processor 501, configured to implement a function of the VNFM or the NFVO in the method provided in the embodiments of this application. For example, the processor 501 may be configured to assign N dedicated parameters and a value of each dedicated parameter to a modifiable attributes parameter in a VNFD based on a second assignment indication. For details, refer to the detailed descriptions in the method examples. Details are not described herein again.

The communication apparatus 500 may further include at least one memory 502, configured to store program instructions and/or data. The memory 502 is coupled to the processor 501. The coupling in this embodiment of this application is indirect coupling or a communication connection between apparatuses, units, or modules for information exchange between the apparatuses, the units, or the modules, and may be in electrical, mechanical, or other forms. The processor 501 may operate with the memory 502. The processor 501 may execute the program instructions stored in the memory 502. At least one of the at least one memory may be included in the processor.

The communication apparatus 500 may further include a communication interface 503, configured to communicate with another device by using a transmission medium, so that an apparatus in the communication apparatus 500 can communicate with the another device. For example, if the communication apparatus is a VNFM, the another device is an NFVO. If the communication apparatus is an NFVO, the another device is a VNFM. The processor 501 receives and sends data through the communication interface 503, and is configured to implement the method performed by the VNFM or the NFVO in the embodiments corresponding to FIG. 2 and FIG. 3.

A specific connection medium between the communication interface 503, the processor 501, and the memory 502 is not limited in this embodiment of this application. In this embodiment of this application, in FIG. 5, the communication interface 503, the processor 501, and the memory 502 are connected through a bus 504. The bus is represented by using a bold line in FIG. 5. A connection manner between other components is merely an example for description, and constitutes no limitation. The bus may be classified into an address bus, a data bus, a control bus, and the like. For ease of representation, only one bold line is used to represent the bus in FIG. 5, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed and completed by a hardware processor, or may be performed and completed by using a combination of hardware and software modules in the processor.

In the embodiments of this application, the memory may be a non-volatile memory such as a hard disk drive (HDD) or a solid-state drive (SSD), or may be a volatile memory such as a random access memory (RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store program instructions and/or data.

The foregoing descriptions of the implementations allow a person skilled in the art to clearly understand that, for the purpose of convenient and brief description, division into only the foregoing function modules is used as an example for description. During actual application, the foregoing functions can be allocated to different function modules for implementation as required. In other words, an inner structure of an apparatus is divided into different function modules to implement all or some of the functions described above.

In the several embodiments provided in this application, it should be understood that the disclosed apparatuses and methods may be implemented in other manners. For example, the foregoing apparatus embodiments are merely examples. For example, division into the modules or units is merely logical function division. There may be another division manner during actual implementation. For example, a plurality of units or components may be combined or integrated into another apparatus, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. A part or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

All or some of the methods in the embodiments of this application may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on a computer, the procedures or functions according to the embodiments of the present invention are all or partially generated. The computer may be a general-purpose computer, a special-purpose computer, a computer network, a network device, a terminal, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a digital video disc (DVD)), a semiconductor medium (for example, an SSD), or the like.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A virtual network function (VNF) deployment method, comprising:

sending, by a network function virtualization orchestrator (NFVO), a Modify VNF Information operation, wherein the Modify VNF Information operation comprises a modifiable attributes parameter, wherein the modifiable attributes parameter comprises N dedicated parameters and a value of each dedicated parameter of the N dedicated parameters, wherein the N dedicated parameters and the value of each dedicated parameter are parameters required for instantiating a first VNF, wherein N is an integer, and wherein N≥1;

receiving, by a virtualized network function manager (VNFM), the Modify VNF Information operation;

sending, by the NFVO, a virtual network function descriptor (VNFD) of the first VNF, wherein the VNFD of the first VNF comprises M common parameters, the modifiable attributes parameter, M first assignment indications, and one second assignment indication, wherein one of the first assignment indications of the M first assignment indications indicates to obtain a value of one of the common parameters from a virtualization service requestor, wherein the second assignment indication indicates to obtain a value of the modifiable attributes parameter from a virtualization service provider, wherein M is an integer, and wherein M≥1;

obtaining, by the VNFM, the VNFD of the first VNF;

assigning, by the VNFM, the N dedicated parameters and the value of each dedicated parameter to the modifiable attributes parameter in the VNFD based on the second assignment indication, and obtaining, as a result of assigning the N dedicated parameters, a first updated VNFD;

sending, by the NFVO, a VNF instantiation request, wherein the VNF instantiation request comprises the M common parameters and a value of each common parameter of the M common parameters, wherein the M common parameters and the value of each common parameter are parameters required for instantiating the first VNF;

receiving, by the VNFM, the VNF instantiation request;

assigning, by the VNFM, the values of the M common parameters to corresponding common parameters in the first updated VNFD based on the first assignment indications, and obtaining, as a result of the assigning the values of the M common parameters, a second updated VNFD; and deploying, by the VNFM, the first VNF based on the second updated VNFD.

2. The method according to claim 1, wherein the virtualization service requestor is at least one of a NFVO or an operations support system/business support system (OSS/BSS), and wherein the virtualization service provider is a VNFM.

3. The method according to claim 2, further comprising performing, before the receiving a Modify VNF Information operation:

receiving, by the VNFM, a Create VNF Identifier operation sent by the NFVO, wherein the Create VNF Identifier operation comprises an identifier of the VNFD of the first VNF;

creating, by the VNFM, an instance identifier of the first VNF;

establishing a correspondence between the instance identifier of the first VNF and the identifier of the VNFD of the first VNF; and sending, by the VNFM, the instance identifier of the first VNF to the NFVO.

4. The method according to claim 3, wherein the obtaining the VNFD of the first VNF comprises:

sending, by the VNFM, a VNFD obtaining request to the NFVO, wherein the VNFD obtaining request comprises the identifier of the VNFD of the first VNF; and receiving, by the VNFM, a VNFD response sent by the NFVO, wherein the VNFD response comprises the VNFD of the first VNF.

5. The method according to claim 3, wherein the Modify VNF Information operation further comprises the instance identifier of the first VNF, and wherein the VNF instantiation request further comprises the instance identifier of the first VNF; and wherein the method further comprises performing, before values are assigned to the M common parameters and the modifiable attributes parameter in the VNFD:

determining, by the VNFM, the identifier of the VNFD of the first VNF associated with the instance identifier of the first VNF; and determining, by the VNFM, the VNFD of the first VNF based on the identifier of the VNFD of the first VNF.

6. The method according to claim 3, further comprising performing, after the creating an instance identifier of the first VNF:

creating, by the VNFM, VNF information storage space, wherein the VNF information storage space is associated with storage of the N dedicated parameters and the value of each dedicated parameter of the N dedicated parameters.

7. The method according to claim 1, further comprising performing, in response to one of the first assignment indications indicating to obtain a value of one of the common parameters from the NFVO, before the sending, by the NFVO, a VNF instantiation request:

setting, by the NFVO, the value of the common parameter.

8. A communication apparatus, comprising:

a transceiver configured to perform communication;

a processor; and a non-transitory computer readable memory storing a program for execution by the processor, the program including instructions to:

receive a Modify virtual network function (VNF) Information operation, wherein the Modify VNF Information operation comprises a modifiable attributes parameter, wherein the modifiable attributes parameter comprises N dedicated parameters and a value of each dedicated parameter of the N dedicated parameters, wherein the N dedicated parameters and the value of each dedicated parameter of the N dedicated parameters are parameters required for instantiating a first VNF, wherein N is an integer, and wherein N≥1;

obtain a virtual network function descriptor (VNFD) of the first VNF, wherein the VNFD of the first VNF comprises M common parameters, the modifiable attributes parameter, M first assignment indications, and one second assignment indication, wherein one of the first assignment indications indicates to obtain a value of one of the common parameters from a virtualization service requestor, wherein the second assignment indication indicates to obtain a value of the modifiable attributes parameter from a virtualization service provider, wherein M is an integer, and wherein M≥1;

assign the N dedicated parameters and the value of each dedicated parameter to the modifiable attributes parameter in the VNFD based on the second assignment indication, and obtain a first updated VNFD as a result of assigning the values of the N dedicated parameters, wherein receive a VNF instantiation request, wherein the VNF instantiation request comprises the M common parameters and a value of each common parameter, and wherein the M common parameters and the value of each common parameter are parameters required for instantiating the first VNF;

assign the values of the M common parameters to corresponding common parameters in the first updated VNFD based on the first assignment indications, and obtain a second updated VNFD as a result of assigning the values of the M common parameters; and deploy the first VNF based on the second updated VNFD.

9. The apparatus according to claim 8, wherein the virtualization service requestor is at least one of a NFVO or an operations support system/business support system (OSS/BSS), and wherein the virtualization service provider is a VNFM.

10. The apparatus according to claim 9, wherein the program further includes instructions to:

receive a Create VNF Identifier operation sent by the NFVO, wherein the Create VNF Identifier operation comprises an identifier of the VNFD of the first VNF;

create an instance identifier of the first VNF, and establish a correspondence between the instance identifier of the first VNF and the identifier of the VNFD of the first VNF; and send the instance identifier of the first VNF to the NFVO.

11. The apparatus according to claim 10, wherein program further includes instructions to:

send a VNFD obtaining request to the NFVO, wherein the VNFD obtaining request comprises the identifier of the VNFD of the first VNF; and receive a VNFD response sent by the NFVO, wherein the VNFD response comprises the VNFD of the first VNF.

12. The apparatus according to claim 10, wherein program further includes instructions to:

determine the identifier of the VNFD of the first VNF associated with the instance identifier of the first VNF; and determine the VNFD of the first VNF based on the identifier of the VNFD of the first VNF.

13. The apparatus according to claim 10, wherein program further includes instructions to:

create VNF information storage space, wherein the VNF information storage space is associated with storage of the N dedicated parameters and the value of each dedicated parameter of the N dedicated parameters.

14. A communication system, comprising:

a network function virtualization orchestrator (NFVO), comprising:

a first transceiver configured to perform communication;

a first processor; and a first non-transitory computer readable memory storing a first program for execution by the first processor; and a virtualized network function manager (VNFM), comprising:

a second transceiver configured to perform communication;

a second processor; and a second non-transitory computer readable memory storing a second program for execution by the second processor:

wherein the first program includes first instructions:

send a Modify virtual network function (VNF) Information operation, wherein the Modify VNF Information operation comprises a modifiable attributes parameter, wherein the modifiable attributes parameter comprises N dedicated parameters and a value of each dedicated parameter of the N dedicated parameters, wherein the N dedicated parameters and the value of each dedicated parameter are parameters required for instantiating a first VNF, wherein N is an integer, and wherein $N \geq 1$;

send a virtual network function descriptor (VNFD) of the first VNF, wherein the VNFD of the first VNF comprises M common parameters, the modifiable attributes parameter, M first assignment indications, and one second assignment indication, wherein one of the first assignment indications indicates to obtain a value of one of the common parameters of the M common parameters from a virtualization service requestor, and wherein the second assignment indication indicates to obtain a value of the modifiable attributes parameter from a virtualization service provider; and send a VNF instantiation request, wherein the VNF instantiation request comprises the M common parameters and a value of each common parameter of the M common parameters, wherein the M common parameters and the value of each common parameter are parameters required for instantiating the first VNF, wherein M is an integer, and wherein $M \geq 1$; and wherein the second program includes second instructions to:

receive the Modify VNF Information operation;

obtain the VNFD of the first VNF;

assign the N dedicated parameters and the value of each dedicated parameter of the N dedicated parameters to the modifiable attributes parameter in the VNFD based on the second assignment indication, and obtain a first updated VNFD as a result of assigning then N dedicated parameters;

receive the VNF instantiation request;

assign the values of the M common parameters to corresponding common parameters in the first updated VNFD based on the first assignment indications, and obtain a second updated VNFD as a result of assigning then M common parameters; and deploy the first VNF based on the second updated VNFD.

15. The system according to claim 14, wherein the virtualization service requestor is at least one of an NFVO or an operations support system/business support system (OSS/BSS), and wherein the virtualization service provider is a VNFM.

16. The system according to claim 15, wherein the second instructions further include instructions to:

receive a Create VNF Identifier operation sent by the NFVO, wherein the Create VNF Identifier operation comprises an identifier of the VNFD of the first VNF;

create an instance identifier of the first VNF, and establish a correspondence between the instance identifier of the first VNF and the identifier of the VNFD of the first VNF; and send the instance identifier of the first VNF to the NFVO.

17. The system according to claim 16, wherein the second instructions further include instructions to:
- send a VNFD obtaining request to the NFVO, wherein the VNFD obtaining request comprises the identifier of the VNFD of the first VNF; and
- receive a VNFD response sent by the NFVO, wherein the VNFD response comprises the VNFD of the first VNF.

18. The system according to claim 16, wherein the second instructions further include instructions to:
- determine the identifier of the VNFD of the first VNF associated with the instance identifier of the first VNF; and
- determine the VNFD of the first VNF based on the identifier of the VNFD of the first VNF.

19. The system according to claim 16, wherein the second instructions further include instructions to:
- create VNF information storage space, wherein the VNF information storage space is associated with storage of the N dedicated parameters and the value of each dedicated parameter of the N dedicated parameters.

20. The system according to claim 14, wherein first instructions further include instructions to:
- set the value of the common parameter.

\* \* \* \* \*